(12) United States Patent
Tzur et al.

(10) Patent No.: US 12,731,603 B2
(45) Date of Patent: Sep. 8, 2026

(54) SPEECH FEATURES-BASED SINGLE CHANNEL VOICE ACTIVITY DETECTION METHOD AND SYSTEM FOR REDUCING NOISE FROM AN AUDIO SIGNAL

(71) Applicant: GM GLOBAL TECHNOLOGY OPERATIONS LLC, Detroit, MI (US)

(72) Inventors: Moshe Tzur, Petah Tikva (IL); Elior Hadad, Ness Tziona, IL (US)

(73) Assignee: GM Global Technology Operations LLC, Detroit, MI (US)

( * ) Notice: Subject to any disclaimer, the term of this patent is extended or adjusted under 35 U.S.C. 154(b) by 486 days.

(21) Appl. No.: 18/302,079

(22) Filed: Apr. 18, 2023

(65) Prior Publication Data

US 2024/0355351 A1 Oct. 24, 2024

(51) Int. Cl.
*G10L 25/84* (2013.01)
*G10L 15/02* (2006.01)
(Continued)

(52) U.S. Cl.
CPC .............. *G10L 25/84* (2013.01); *G10L 15/02* (2013.01); *G10L 15/04* (2013.01);
(Continued)

(58) Field of Classification Search
CPC ......... G10L 25/84; G10L 15/02; G10L 15/04; G10L 21/0232; G10L 25/18; G10L 25/90;
(Continued)

(56) References Cited

U.S. PATENT DOCUMENTS 7,246,058 B2 * 7/2007 Burnett .................. G10L 25/78 704/214
10,573,301 B2 * 2/2020 Kupryjanow ....... G10L 21/0232
(Continued)

OTHER PUBLICATIONS

Z.-Q. Wang and D. Wang, "Mask Weighted Stft Ratios for Relative Transfer Function Estimation and ITS Application to Robust ASR," 2018 IEEE International Conference on Acoustics, Speech and Signal Processing (ICASSP), Calgary, AB, Canada, 2018, pp . 5619-5623. (Year: 2018).*
(Continued)

*Primary Examiner* — Andrew C Flanders
*Assistant Examiner* — Cameron Kenneth Young
(74) *Attorney, Agent, or Firm* — Quinn IP Law

(57) ABSTRACT

The single-channel, Speech Features-Based Voice Activity Detection (SFVAD) system is a robust, low-latency system that generates per-frame speech and noise indications, along with calculating a pair of speech and noise time-frequency masks. The SFVAD system controls an adaptation mechanism for a Beam-Forming system control module and improves the speech quality and noise reduction capabilities of Automatic Speech Recognition applications, such as Virtual Assistance (VA) and Hands-Free (HF) calls, by robustly handling transient noises. The system extracts speech-like patterns from an input audio signal and it is invariant to the power-level of the input audio signal. Noise calculation is controlled by a pair of speech features-based detectors (voiced and unvoiced). A Cepstral-based pitch detector and a Centrum calculation method are used to prevent contamination of the calculated noise by speech content. The SFVAD system robustly handles instant changes of background noise level and has dramatically lower false detection rates.

15 Claims, 9 Drawing Sheets

(51) Int. Cl.

| | |
|---|---|
| ***G10L 15/04*** | (2013.01) |
| ***G10L 21/0232*** | (2013.01) |
| ***G10L 25/18*** | (2013.01) |
| ***G10L 25/90*** | (2013.01) |
| ***G10L 25/93*** | (2013.01) |

(52) U.S. Cl.
CPC .......... *G10L 21/0232* (2013.01); *G10L 25/18* (2013.01); *G10L 25/90* (2013.01); *G10L 25/93* (2013.01)

(58) Field of Classification Search
CPC . G10L 25/93; G10L 21/0208; G10L 21/0216; G10L 25/24; G10L 2021/02166
See application file for complete search history.

(56) References Cited

U.S. PATENT DOCUMENTS

| | | | | |
|---|---|---|---|---|
| 2018/0033447 | A1* | 2/2018 | Ramprashad | G10L 25/21 |
| 2023/0253010 | A1* | 8/2023 | Babu | G10L 25/24 704/200 |
| 2023/0317100 | A1* | 10/2023 | Yang | G10L 15/02 704/233 |

OTHER PUBLICATIONS

D. You, J. Han, G. Zheng and T. Zheng, "Sparse power spectrum based robust voice activity detector," 2012 IEEE International Conference on Acoustics, Speech and Signal Processing (ICASSP), Kyoto, Japan, 2012, pp. 289-292. (Year: 2012).*

* cited by examiner

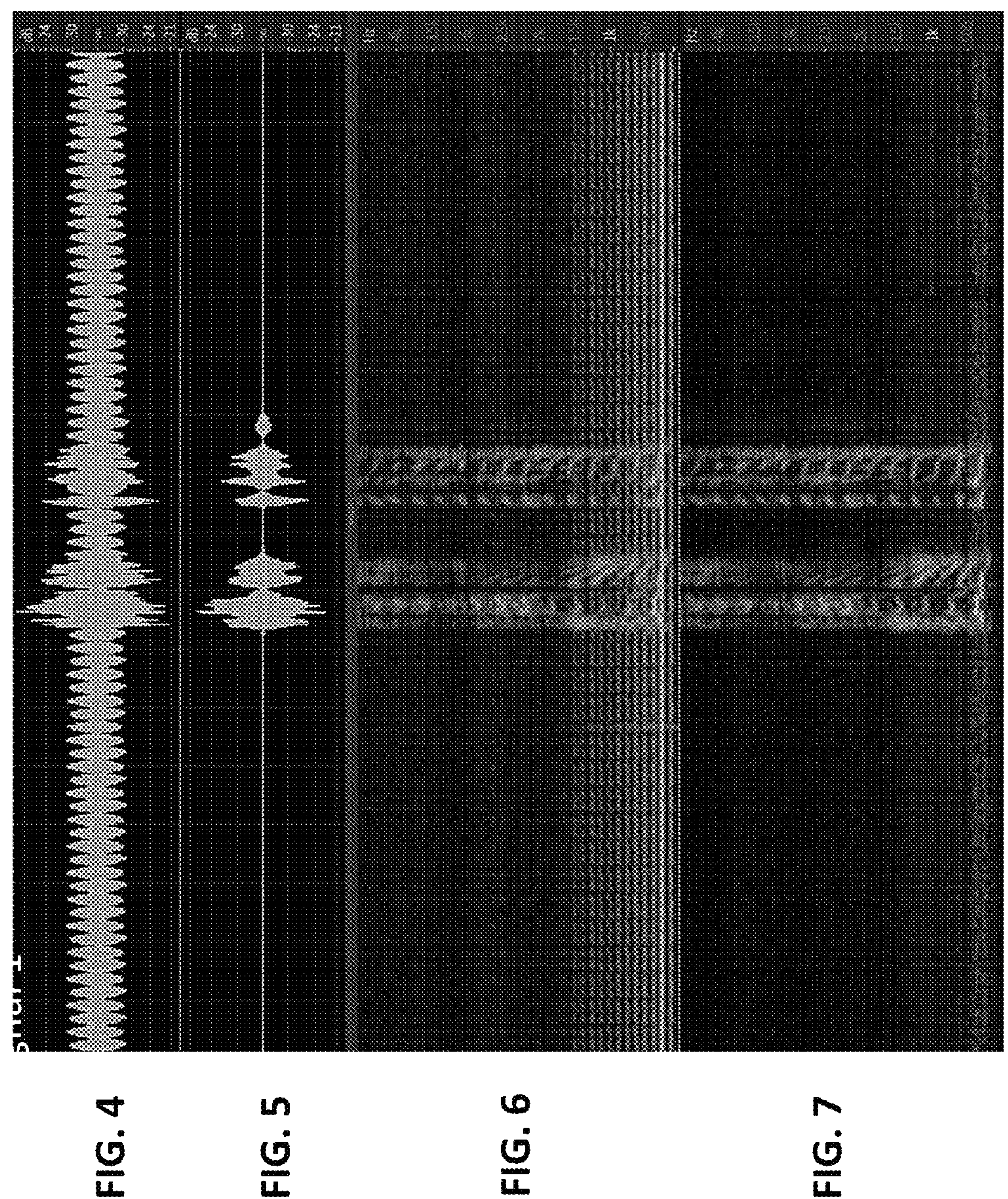
FIG. 4 Input Audio Signal
FIG. 5 Output Audio Signal
FIG. 6 Input Audio Signal
FIG. 7 Output Audio Signal

SPEECH FEATURES-BASED SINGLE CHANNEL VOICE ACTIVITY DETECTION METHOD AND SYSTEM FOR REDUCING NOISE FROM AN AUDIO SIGNAL

INTRODUCTION

This disclosure relates to Digital Signal Processing (DSP) and Automatic Speech Recognition (ASR) systems. In particular, the disclosure relates to the use of Adaptive Filtering for Voice Activity Detection (VAD) in a motor vehicle environment with significant background noise.

Voice Activity Detection is a key component in any Automatic Speech Recognition (ASR), Hands-Free, or Voice-Over-IP (VOIP) system. VAD methods are a class of digital signal processing methods that detects the presence (or absence) of speech in short segments of an audio signal. VAD systems analyze incoming audio signals and identifies segments of speech and non-speech (e.g., noise). VAD systems are used in speech communication systems, and their use: (1) improves channel capacity, (2) reduces co-channel interference and power consumption in portable electronic devices in cellular radio systems, and (3) enables simultaneous voice and data applications in multimedia communications. "Adaptive filtering" means that the applied filters change with time during real-time, sequential analysis of an input audio signal.

A basic VAD system works by extracting measured features from the incoming audio signal, which is divided into a sequential series of short time frames having a fixed window of time equal to, for example, 5-40 milliseconds duration. The extracted features from the input audio signal are then compared to a threshold limit (often determined from the noise-only periods of the input audio signal) and a VAD decision (0 or 1) is computed. If the feature of the input audio frame exceeds the threshold value, a positive VAD decision (VAD=1) is computed that identifies when speech is present in a selected segment of time (i.e., time frame). Otherwise, a negative VAD decision (VAD=0) is computed that identifies the absence of speech in the input audio frame.

False indications from conventional VAD systems may lead to non-optimal noise reduction, or even to self-reduction of the desired speech source, especially when a dynamic environment (like an in-car acoustic scene) is considered. The VAD system often controls the operation of other functionalities, such as adaptation to the desired audio source and noise reduction. The system is often used to maintain low power consumption during speech-absent segments. It also operates as a first-stage, pre-processing module for use in more complex VAD architectures (as will be presented below). As a result, VAD errors may have severe consequences for the ASR system.

Conventional VAD algorithms are often based on using energy thresholds, entropy measures, zero crossing rates, and various other statistical measures. While "energy-based" VADs are commonly used as first-stage detectors, their performance is degraded when transient noise or low Signal-to-Noise ratio (SNR) scenarios are encountered. Transient noises in a motor vehicle environment can be caused by road (tire and wind) noise, HVAC system operation, and/or repetitive noises from rotating LIDAR sensors mounted on the motor vehicle's roof. Against this background, the present disclosure was developed.

SUMMARY

This disclosure relates to a computerized, single-channel, Speech Features-based Voice Activity Detection (SFVAD) system. The SFVAD system is a robust, low-latency system and method that estimates per-frame speech and noise indications through the application of a pair of speech and noise time-frequency (T-F) masks. The SFVAD system efficiently tracks the spectral properties of the ambient noise and estimates speech-noise indications based on the extraction of speech-like patterns from the input audio signal. The SFVAD system controls an adaptation mechanism for a Beam-Forming system control module and improves the speech quality and noise reduction capabilities of Automatic Speech Recognition applications, such as Virtual Assistance and Hands-Free calls, by robustly handling transient noises. The SFVAD system extracts speech-like patterns from an input audio signal and is invariant to the power-level of the input audio signal. Noise identification is controlled by a pair of speech features-based detectors (i.e., voiced and unvoiced). A Cepstral-based pitch detector and a Centrum calculation method are used to prevent contamination of the calculated noise by speech content. The SFVAD system robustly handles instant changes of background noise level and has dramatically lower false detection rates.

The computerized Speech Features-based Voice Activity Detection (SFVAD) system utilizes the fact that speech is often comprised of a few dominant frequency eigenvalues distributed across a spectrum of frequency bins. The SFVAD system operates in a log-spectral domain, which allows for more precise handling of variations of the audio signal's power level. The methodology used by the SFVAD system is closely related to the way sound pressure level is perceived by the human auditory system. Noise identification is controlled by a pair of speech-features detectors (i.e., voiced and unvoiced) and is utilized to suppress the noise component of the input audio signal generated by one or more microphones. Noise adaptation occurs in the Beam-Forming System module. The SFVAD system robustly handles instant changes of background noise level. False detection rates are dramatically decreased when compared to a conventional "energy-based" VAD system. The SFVAD system also provides an accurate speech time-frequency mask that improves the calculation of Relative Transfer Functions (RTFs), while increasing both speech quality and noise reduction capabilities.

The computerized SFVAD system is a robust, low-latency computerized method and system that estimates per-frame speech and noise indications through the application of speech and noise Time-Frequency (T-F) masks. The SFVAD system is aimed at (1) controlling the adaptation mechanism of a Beam-Forming system control module, and (2) improving the speech quality and noise reduction capabilities of ASR applications, such as Virtual Assistance and Hands-Free calls, by robustly handling transient noises. One useful aspect of the current SFVAD system is the demonstrated ability to attenuate, by more than 35 dB, the noise produced by the rotating mechanism of a LIDAR sensor (a laser-based sensor which is becoming a must-have component in future cars). The current SFVAD system efficiently tracks the spectral properties of ambient noise and estimates speech vs noise indications based on the extraction of speech-like patterns from the input audio signal. The SFVAD system is robust to transient noises and is invariant to the power-level of an input audio signal. The statistical properties of the ambient noise are efficiently tracked by the SFVAD system by using a Cepstral-based pitch detector and a Centrum calculation method to prevent the contamination of the calculated noise by speech content during segments of speech.

A first example of a computerized SFVAD method includes performing the following steps for reducing noise from an input audio signal, including: a) providing an input audio signal comprising speech and noise components; b) dividing the input audio signal into a sequential series of time frames; c) identifying a speech segment and a noise segment from the input audio signal; d) extracting a speech features-based pattern from the input audio signal; c) subtracting the noise segment from the input audio signal; and f) generating an enhanced output audio signal that has reduced noise.

The first example of a SFVAD method further includes controlling an adaptation of a beam-forming system by utilizing speech and noise time-frequency masks. The SFVAD method is invariant to a power-level of the input audio signal. The sequential series of time frames have a fixed window of time ranging from 5 to 40 milliseconds. The SFVAD method further includes tracking and analyzing one or more statistical properties of the input audio signal by using a Cepstral-based pitch detector and a Centrum calculation method to prevent contamination of the noise segments by speech content. The SFVAD method further includes analyzing a previous speech segment; and then resetting a Beam-Forming system control module using information learned from analyzing the previous speech segment. The SFVAD method further includes reducing noise from the input audio signal; wherein the reducing noise step is performed in a log-spectral domain by calculating noise statistics from a noise spectrum of the input audio signal.

The first example of a SFVAD method further includes calculating noise statistics of the input audio signal by using two complementary speech features-based detectors for detecting voiced and unvoiced speech, respectively; and preventing contamination of each noise segment by speech. The SFVAD method further includes detecting a voiced speech segment by using a Cepstral-based pitch detector to identify a dominant pitch from a segment of the input audio signal; and preventing a contamination of the noise segment by the voiced speech segment. The SFVAD method further includes using an unvoiced speech detector that detects an unvoiced speech segment by using a Centrum calculation of higher expected frequencies of each speech segment; and preventing contamination of the noise identification by the unvoiced speech segment.

The first example of a SFVAD method further includes using a sparsity-based speech detector that identifies speech utterances by using an innovative sparsity measure, S(SNR), which equals the difference between the proposed weighted average of the SNR and the arithmetic average of the SNR in the log-spectrum domain. The SFVAD system continuously adapts to spectral changes in both the desired speech source and the ambient noise. The SFVAD method further includes operating the method in a log-spectral domain. The SFVAD method further includes using a speech time-frequency mask to improve a calculation of one or more microphone Relative Transfer Functions (RTFs).

The first example of a SFVAD method further includes providing a Speech Features-based Voice Activity Detection (SFVAD) system; utilizing dominant speech features; adapting, over time, the SFVAD method to spectral changes of the noise components; and calculating per-frame speech and noise indications by using speech and noise time-frequency masks, respectively. The SFVAD system has a low-latency because it operates on a single time-frame at a time.

A second example relates to a computerized audio Beam-Forming System that reduces noise from an input audio signal, which includes: a single-channel Voice Activity Detector module (SCVAD); a first logic switch; a Directional Voice Activity Detector (DVAD) module; a second logic switch; a microphone Relative Transfer Functions (RTFs) Calculator module; and a Beam-Forming System control module; wherein the input audio signal is inputted into SCVAD module; wherein the SCVAD module outputs three signals: $I_S(l)$, $M_S(l,k)$, and $M_N(l,k)$, wherein: $I_S(l)$=a binary speech indicator that=1 if only speech is present and =0 if not only speech is present, $M_S(l,k)$=Speech T-F Mask, and $M_N(l,k)$=Noise T-F Mask (wherein "T-F" is shorthand for "time-frequency"); wherein the noise mask, $M_N(l,k)$, is inputted into the Beam-Forming System module; wherein the speech mask, $M_S(l,k)$, is inputted into the RTFs Estimator module; wherein the binary speech indicator signal, $I_S(l)$, is inputted into the first logic switch (which controls if and when the noisy input audio signal is inputted into a Directional VAD module); wherein the Directional VAD module outputs a binary direction speech indicator signal, $I_{DS}(l)$, where $I_{DS}(l)$=a binary directional speech indicator signal that=1 if only directional speech is present and =0 if not only directional speech is present; wherein the binary speech indicator signal, $I_{DS}(l)$, is inputted into the second logic switch (which controls if the input audio signal is inputted into the microphone RTFs Calculator module); wherein the microphone RTFs Calculator module outputs a calculation of the microphones' Relative Transfer Functions (RTFs), with respect to the location of the desired speech source for a specified Time-Frequency bin, that is represented by $\hat{h}(l, k)$. The calculated RTFs output vector, $\hat{h}(l, k)$, is inputted into the Beam-Forming System module. In parallel, the input audio signal is inputted into the Beam-Forming System control module. Finally, the Beam-Forming System control module outputs an enhanced output audio signal, y(l,k), that has reduced noise. The SFVAD system includes a motor vehicle body defining a vehicle interior; road wheels connected to the motor vehicle body; a computer processing unit connected to the motor vehicle body; and a plurality of microphones disposed inside of the motor vehicle's interior, operably connected to the computer processing unit; wherein the audio Beam-Forming control system is controlled by the computer processing unit.

The Single-Channel Voice Activity Detector (SCVAD) system includes a Log-Spectral Noise Suppression module; a Sparsity Detection module; an Energy-based Speech and Noise Bin-Maps Calculation module; a Pitch-Calculation module; a Centrum Calculation module; a Noise Statistics Calculation module; a Decision Block module; and a $Z^{-1}$ module; wherein the input audio signal, x(l,k), is inputted to the Log-Spectral Noise Suppression module and also inputted to the Noise Statistics Calculation module; wherein a first output from the Log-Spectral Noise Suppression module comprises a Signal-to-Noise Ratio measure, $\widehat{SNR}(l,k)$, that is inputted, in parallel, into four modules, including: (1) the Sparsity Detection module; (2) the Energy-based Speech and Noise Bin-Maps Calculation module; (3) the Pitch Calculation module; and (4) the Centrum Calculation module; wherein a second output from the Sparsity Detection module is inputted into the Decision Block module; wherein a third output from the Energy-based Speech and Noise Bin-Maps Calculation module is inputted into the Decision Block module; wherein a fourth output from the Pitch Calculation module is inputted into both the Decision Block module and the Noise Statistics Calculation module; wherein a fifth output from the Centrum Calculation module is inputted into both the Decision Block module and the Noise Statistics Calculation module; wherein a sixth output from the Noise Statistics Calculation module, $\widehat{\langle v \rangle}$ (l, k), is inputted to the $Z^{-1}$ module; wherein a seventh output from the $Z^{-1}$ module is fed back into the Log-Spectral Noise Suppression module and is utilized for Log-Spectral Noise Suppression in a next time frame; wherein the Decision Block module outputs four parameters: $I_S$(l), $I_N$(l), $M_S$(l,k), and $M_N$(l,k); wherein $I_S$(l)=a binary speech indicator that=1 if only speech is present and =0 if not only speech is present; wherein $I_N$(l)=a binary noise indicator that=1 if only noise is present and =0 if not only noise is present; wherein $M_S$(l, k)=Speech T-F Mask; wherein $M_N$(l,k)=Noise T-F Mask; wherein "l" represents a selected time frame from the noisy input audio signal, x(l,k); and wherein "k" represents a selected frequency bin from the noisy input audio signal, x(l,k).

A "Time-Frequency mask" is a vector of binary values (for noise and/or speech) that is associated with each frequency bin, "k", for each time frame, "l".

A third example is a computer-readable medium that includes computer instructions for: a) providing an input audio signal comprising speech and noise components; b) dividing the input audio signal into a sequential series of time frames; c) identifying speech segments and noise segments from the input audio signal; d) extracting a speech features-based pattern from the input audio signal; c) subtracting the noise segment from the input audio signal; and f) generating an enhanced output audio signal that has reduced noise. The step of subtracting the noise segment from the input audio signal is used for making more accurate VAD detections. The actual noise reduction step is applied by the Beam-Forming system control module and is controlled via use of the Noise time-frequency mask, $M_N$(l,k).

The computer-readable medium further includes computer instructions for g) providing a Speech Features-Based Voice Activity Detection (SFVAD) system; h) utilizing dominant speech features; i) adapting the SFVAD system to spectral changes of the noise components over time; and j) calculating speech and noise time-frequency masks at each time-frame. The instructions further comprise: k) identifying noise segments by using two different complementary speech features-based detectors that detect voiced and unvoiced speech, respectively; and l) preventing contamination of the identified noise segments by speech. The instructions further comprise: m) detecting a voiced speech segment by using a Cepstral-based pitch detector to identify a dominant pitch from a segment of the input audio signal; n) preventing a contamination of the calculated noise segments by the voiced speech segment; o) detecting an unvoiced speech segment by using a Centrum calculation of higher expected frequencies from a segment of the input audio signal; and p) preventing a contamination of the calculated noise segments by the unvoiced speech segment.

BRIEF DESCRIPTION OF THE DRAWINGS

FIG. 4 shows an example oscillogram showing an input audio signal amplitude versus time (taken from a real recording from a single microphone located inside of a motor vehicle) that illustrates segments of speech against a background of repeating noises that are generated by a rotating LIDAR sensor located on a roof of a motor vehicle, according to the present disclosure.

FIG. 5 shows an example oscillogram showing an output audio signal amplitude versus time (generated from the SFVAD system for the signal from FIG. 4 from a real recording from a single microphone located inside of a motor vehicle) that illustrates reduction of the background of repeating noises that are generated by a rotating LIDAR sensor located on a roof of a motor vehicle, according to the present disclosure.

FIG. 6 shows an example of a spectrogram of frequency bins of the input audio signal versus time (taken from a real recording from a motor vehicle, See FIG. 4), illustrating two segments of speech against a background of repetitive noise generated by a rotating LIDAR sensor, according to the present disclosure.

FIG. 7 shows an example of a spectrogram of frequency bins versus time (taken from a real recording from inside of a motor vehicle, see FIG. 4) illustrating an output audio signal solution that is generated by the SFVAD method, according to the present disclosure. The LIDAR noise is substantially removed using the SFVAD system.

DETAILED DESCRIPTION

The Speech Features-based Voice Activity Detection (SFVAD) system is a robust, low-latency system that estimates per-frame speech and noise indications through the application of speech and noise time-frequency (TF) masks. The current SFVAD system is aimed at: (1) providing an adaptation mechanism for controlling a beam-forming control module, and (2) improving the speech quality and noise reduction capabilities of Automatic Speech Recognition (ASR) applications, such as Virtual Assistance and Hands-Free calls, by robustly handling transient noises. The SFVAD system efficiently tracks the spectral properties of ambient noise and estimates speech vs noise indications based on the extraction of speech-like patterns from the input audio signal. The SFVAD system is robust to transient noises and is invariant to the power-level of an input audio signal.

A spectrogram is a three-dimensional plot of the magnitude of the various frequency components versus time of an audio signal, generated by dividing the input audio signal into time frames and applying a Short Time Fourier Transform (STFT) to each time frame of the input audio signal. The input audio signal, x(l,k), is divided into a sequential series of short time frames having a fixed window of time of, for example, about 5-40 milliseconds long; wherein "l" refers to the frame number, and "k" refers to the selected frequency bin of a Short Time Fourier Transformed input audio signal. The term "T-F" means Time-Frequency. The phrases "background noise" and "ambient noise" are used interchangeably, and they mean a "noise component of the input audio signal." The words "segment" and "time frame" and "frame" are used interchangeably, and they mean the same thing, i.e., a "fixed window of time" of the time-dependent input audio signal. The word "estimated" means "calculated".

Consider a single microphone scenario, where the input audio signal, $x_{ref}(\ell, k)$, is defined as the summation of two independent signals (i.e., speech and noise):

$$x_{ref}(\ell, k) = h_{ref}(\ell, k) * s(l, k) + v_{ref}(\ell, k) \quad (1)$$

where $s(\ell, k)$ is the desired speech audio input source at time frame $\ell$ and frequency bin k; and where $v_{ref}(\ell, k)$ is the noise component (comprising any combination of stationary and transient ambient noises) that is monitored by the selected reference microphone; and where $h_{ref}(l,k)$ is the acoustic transfer function from the speech source location to the position of the selected microphone of the input audio signal. Let us define the log-spectrum of the noise components, by:

$$x_{dB}(\ell, k) = 20 \log 10(|x_{ref}(\ell, k)|) \quad (2)$$

Figure 1:
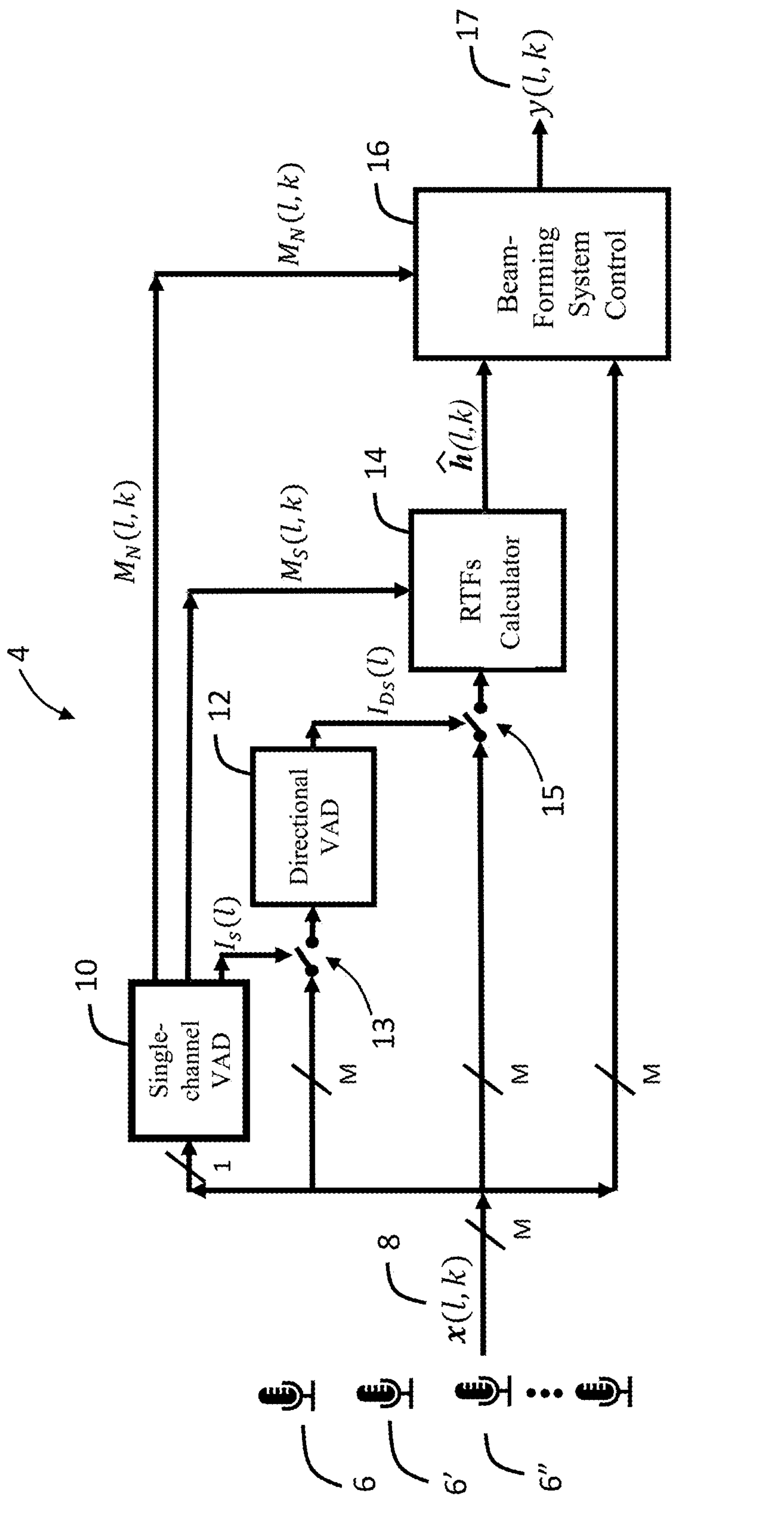
FIG. 1 shows an example of a schematic block diagram of a Beam-Forming system control system, illustrating how a single-channel VAD (SCVAD) module controls the operation of a beam-forming system module, according to the present disclosure.

Using the above notation, FIG. 1 illustrates a block diagram of the SFVAD system architecture.

FIG. 1 shows an example of a schematic block diagram of a Beam-Forming control system 4, illustrating how a Single-Channel VAD (SCVAD) module 10 controls the operation of a Beam-Forming System control module 16, according to the present disclosure. First, an input audio signal 8, x(l,k), is generated by one or more microphones 6, 6', 6", etc. (which can be located, for example, inside of a motor vehicle). The input audio signal 8 contains both speech and noise components. The input audio signal 8 from a first reference microphone "ref" (e.g., microphone 6") is inputted to SCVAD module 10. At each time frame, SCVAD module 10 generates three time-varying outputs: $I_S(l)$, $M_S(l,k)$, and $M_N(l,k)$, wherein:

$I_S(l)$=a binary variable that=1 if only speech is present and =0 if not only speech is present;

$M_S(l,k)$=a Speech Time-Frequency Mask; and $M_N(l,k)$=a Noise Time-Frequency Mask.

The first binary output variable, $I_S(l)$, is then inputted to a first logic switch 13, which (when closed) sends input audio signal 8 to a Directional VAD module 12 when $I_S(l)=1$ (i.e., only speech is present). Next, Directional VAD module 12 generates a second binary output, $I_{DS}(l)$, wherein $I_{DS}(l)$=a binary variable that=1 if only directional speech is present and =0 if not only directional speech is present. Then, the second binary variable, $I_{DS}(l)$, is inputted to a second logic switch 15, which (when closed) sends input audio signal 8 to a RTFs Calculator module 14 when $I_{DS}(l)=1$ (i.e., only directional speech is present). Next, the RTFs Calculator module 14 generates an output vector, h(l, k) that is then inputted to Beam-Forming System control module 16. Finally, Beam-Forming System control module 16 generates an output signal 17, y(l,k), which has the noise component substantially reduced. In addition to these operations, the SCVAD module 10 also generates two masks: $M_N(l,k)$ (noise time-frequency mask) and $M_S(l,k)$ (speech time-frequency mask). The speech T-F mask, $M_S(l,k)$, is inputted to RTFs Calculator module 14, and the noise T-F mask, $M_N(l,k)$, is inputted to the Beam-Forming System control module 16. This last pair of operations comprise examples of innovative features of the present disclosure. The SCVAD module 10 serves as a first gate, which enables the operation of Directional VAD module 12 when speech is indicated (i.e., $I_S(l)=1$). The SCVAD module 10 also generates speech and noise time-frequency masks ($M_S(l,k)$, and $M_N(l,k)$) that controls the adaptation of the microphone RTFs Calculation module 14 and the Beam-Forming System control module 16, respectively.

Figure 2:
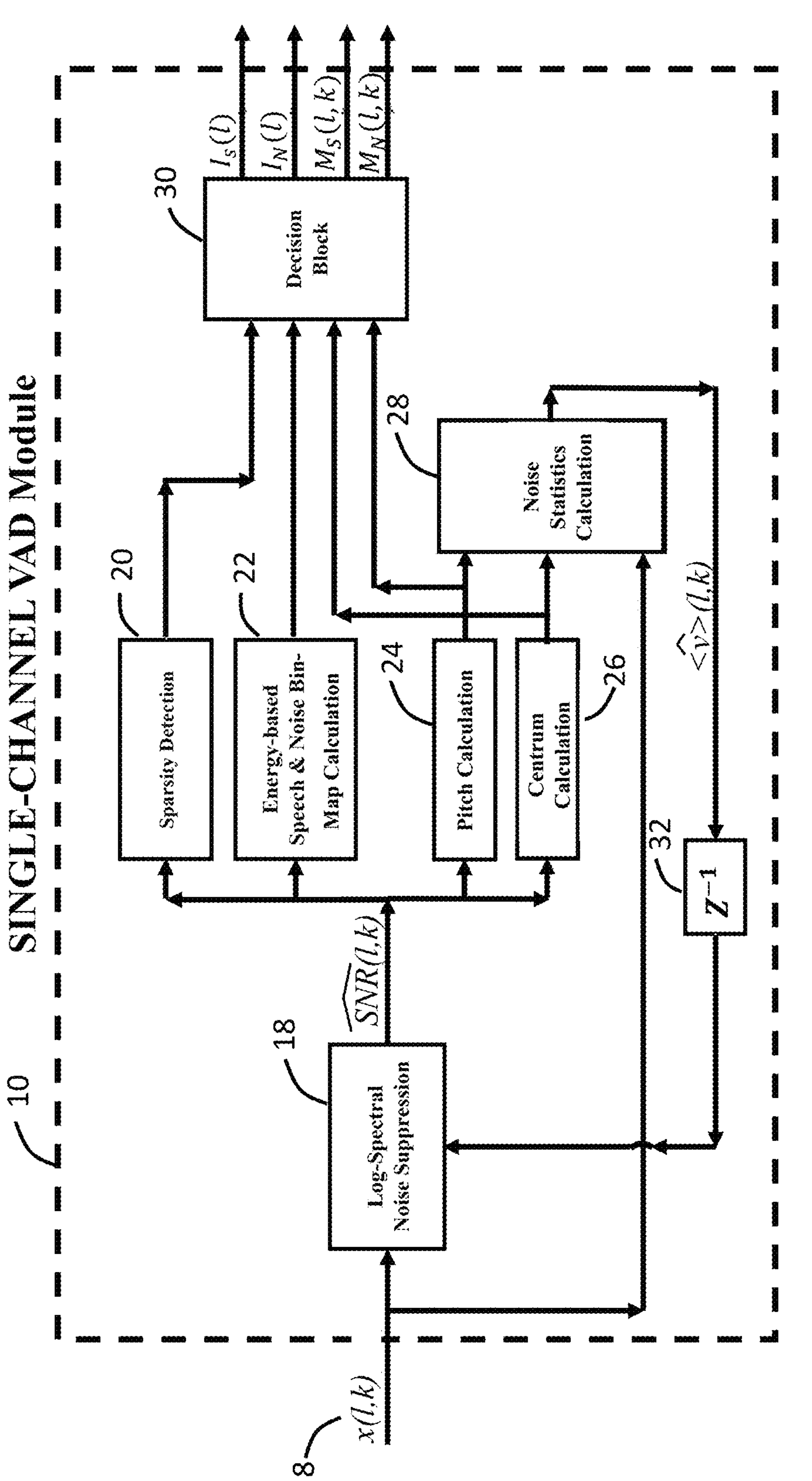
FIG. 2 shows an example of a schematic block diagram of the architecture of the Single-Channel VAD (SCVAD) system, according to the present disclosure.

FIG. 2 shows an example of a schematic block diagram of the architecture of the Single-Channel VAD (SCVAD) module 10, according to the present disclosure. The input audio signal 8, x(l,k), is inputted to both the Log-Spectral Noise Suppression module 18 and to the Noise Statistic Calculation module 28. The output, SNR(l,k), from the Log-Spectral Noise Suppression module 18 is inputted in parallel to four different modules, including: the Sparsity Detection module 20; the Energy-based Speech and Noise Bin-Maps Calculation module 22; the Pitch Calculation module 24; and the Centrum Calculation module 26. The output from these four modules 20, 22, 24, and 26 is then inputted to Decision Block module 30. Decision Block module 30 generates four output signals: $I_S(l)$, $I_N(l)$, $M_S(l,k)$, and $M_N(l, k)$ (which have been previously defined). The output from Pitch Calculation module 24 and Centrum Calculation module 26 is also inputted to Noise Statistics Calculation module 28. The Noise Statistics Calculation module 28 then generates an averaged output signal, $<\hat{v}>(l,k)$, that is stored for Log-Spectral Noise Suppression in the next time frame. The $Z^{-1}$ module 32 denotes a buffer comprising one time step (i.e., one time frame). It is an elementary block that is used in signal processing. The output from the $Z^{-1}$ module 32 is fed back to the Log-Spectral Noise Suppression module 18, which provides SNR calculation for the next time frame.

Figure 3:
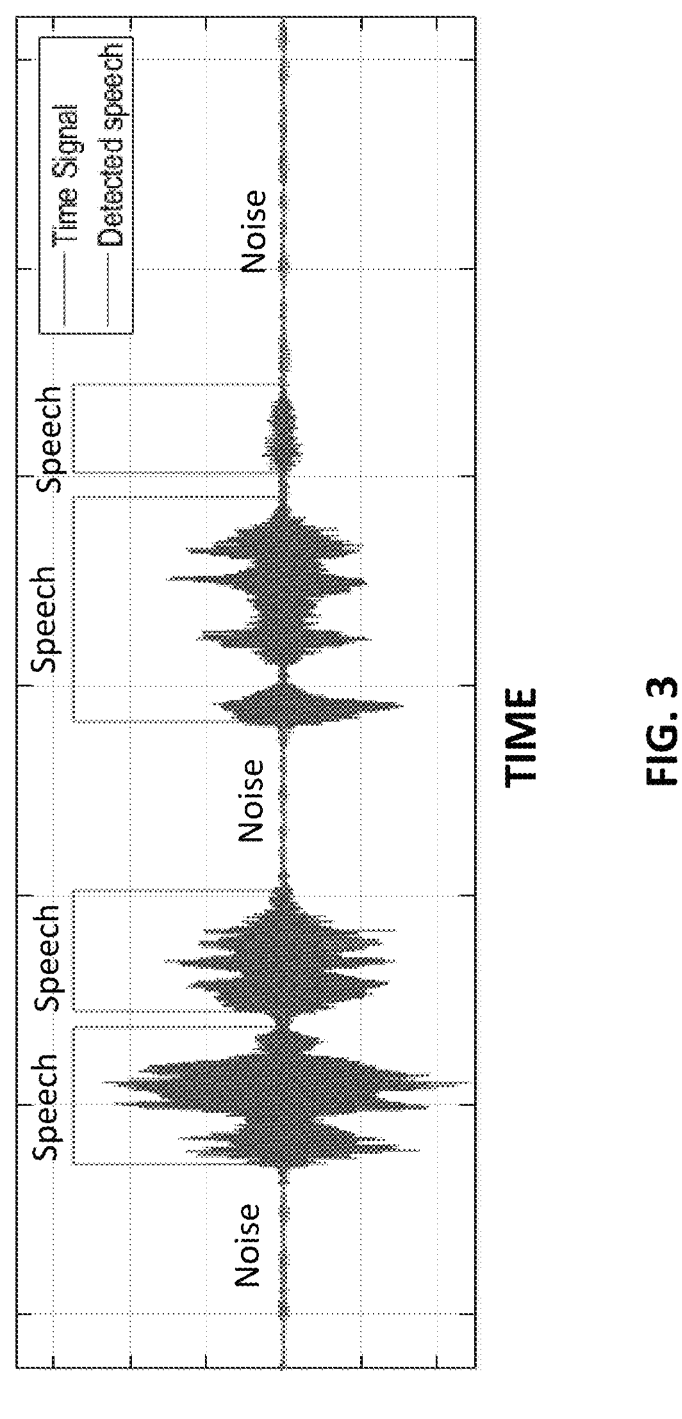
FIG. 3 shows an example of an oscillogram showing an input audio signal's sound pressure amplitude versus time, wherein multiple regions of detected speech are indicated, against a background of ambient noise, according to the present disclosure.

FIG. 3 shows an example of an oscillogram showing an input audio signal's amplitude versus time, wherein multiple regions of detected speech have been identified, according to the present disclosure.

FIG. 4 shows an example oscillogram showing an input audio signal amplitude versus time (taken from a real recording from a single microphone located inside of a motor vehicle) that illustrates segments of speech against a background of repeating noises that are generated by a rotating LIDAR sensor located on a roof of a motor vehicle, according to the present disclosure.

FIG. 5 shows an example oscillogram showing an output audio signal amplitude versus time (generated from the SFVAD system for the signal from FIG. 4 from a real recording from a single microphone located inside of a motor vehicle) that illustrates reduction of the background of repeating noises that are generated by a rotating LIDAR sensor located on a roof of a motor vehicle, according to the present disclosure.

FIG. 6 shows an example of a spectrogram of frequency bins of the input audio signal versus time (taken from a real recording from a motor vehicle, see FIG. 4), illustrating two segments of speech against a background of repetitive noise generated by a rotating LIDAR sensor, according to the present disclosure.

FIG. 7 shows an example of a spectrogram of frequency bins versus time (taken from a real recording from inside of a motor vehicle, see FIG. 4) illustrating an output audio signal solution that is generated by the SFVAD method, according to the present disclosure. The LIDAR noise is substantially removed using the SFVAD system.

Figures 8, 9:
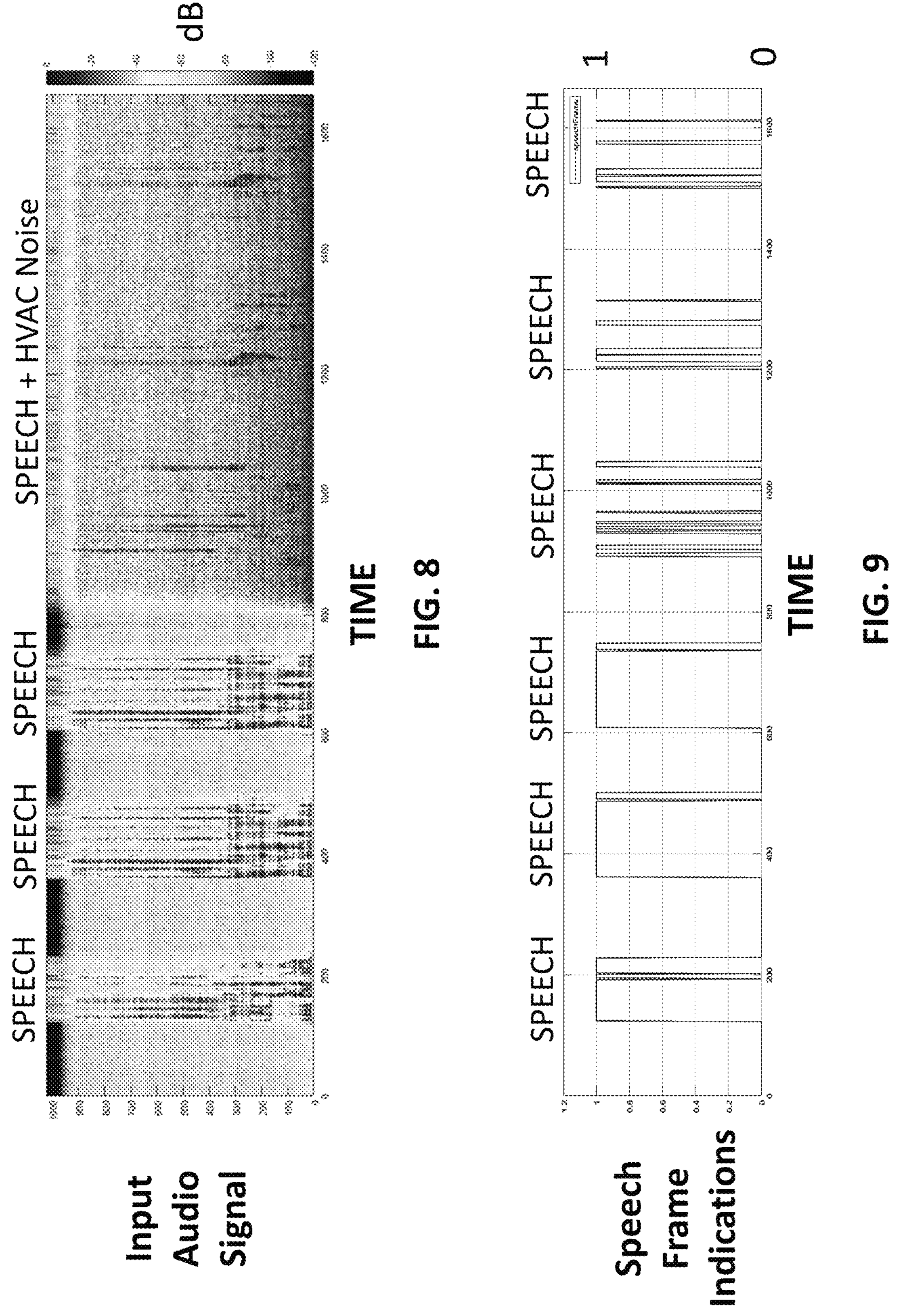
FIG. 8 shows an example of a spectrogram of frequency bins versus time (taken from a real recording from inside of a motor vehicle) illustrating three segments of speech followed by a segment of speech plus broad-spectrum noise caused by activation of an HVAC system (e.g., an air conditioning system), according to the present disclosure.
FIG. 9 shows an example of a plot of speech frame indications versus time for the input audio signal from FIG. 8, generated by the SFVAD method, according to the present disclosure. The indications of speech are much more accurate using the SFVAD system.

FIG. 8 shows an example of a spectrogram of frequency bins versus time of an input audio signal (taken from an actual recording from inside of a motor vehicle) illustrating three sequential segments of speech, followed by a segment of broad-spectrum noise caused by instant activation of a HVAC system (e.g., an air conditioning system), according to the present disclosure.

FIG. 9 shows an example of a plot of speech frame indications versus time for the input audio signal from FIG. 8, generated by the SFVAD method, according to the present disclosure.

Log-Spectral Noise Suppression

In the current SFVAD system, noise suppression is performed in the log-spectral domain by calculating statistics of the ambient noise (using a method which will be described later). We denote the log-spectrum of calculated noise as $\langle v_{dB} \rangle(\ell,k)$. The log-spectral noise suppression can be described as follows (where "SNR" refers to a Signal-to-Noise Ratio):

$$SNR_{dB}(\ell, k) = y_{dB}(\ell, k) - \langle v_{dB} \rangle(\ell - 1, k) \quad (3)$$

Where $SNR_{dB}$ is the suppressed log-spectrum of the input audio signal, x(l,k), which can also be realized as a naive estimation to the SNR (i.e., a posteriori SNR).

Cepstrum-Based Pitch Detection

The calculation of the noise's statistics is controlled by two complementary speech features-based detectors, which aim to prevent the contamination of the noise calculation in the presence of speech. The first detector aims to detect voiced speech segments by utilizing its natural harmonic structure (i.e., the existence of a dominant pitch). In order to determine the periodicity of the log-spectrum, a Short-Time Fourier Transform (STFT) is applied over the frequency bins of $SNR_{dB}(\ell,k)$, thereby establishing its Cepstral representation as:

$$\widetilde{SNR}_{Cesp}(\ell, q) = \frac{1}{10} STFT_k\{\widetilde{SNR}_{dB}(\ell, k)\} \quad (4)$$

Voiced speech segments comprise a sound source generated by vibration of a person's vocal cords, which modulate a low-frequency spectral envelope (represented by the Formants in the frequency domain) that is generated by the physical structure of the vocal tract. Applying a logarithm function over the speech signal separates the pitch frequency from the modulated envelope, causing the pitch component to only be present in the higher cepstral coefficients (whereas the formants are described by the lower cepstral coefficients). Thus, tracking the maximal magnitude within the range of feasible pitch representations is established here for voiced speech detection, which can be described mathematically as follows:

$$P_{mag}(\ell) = \max_{q \in [q_{min}, q_{max}]} \widetilde{SNR}_{Cesp}(l, q) \quad (5)$$

$$I_{voiced}(\ell) = \begin{cases} 1, & \text{if } \dfrac{P_{mag}(\ell)}{\langle P_{mag}(\ell) \rangle} \geq P_{th} \\ 0, & \text{otherwise} \end{cases} \quad (6A)$$

$$P_{mag}(l) = \max_{q \in [q_{min}, q_{max}]} STFT_k\{\log_{10}(\widetilde{SNR}(l, k))\}(l, q) \quad (6B)$$

where $q_{min}$ and $q_{max}$ denote the representations of the maximal and minimal feasible pitch frequencies, respectively, and $P_{mag}(\ell)$ denotes the pitch's amplitude in time frame C. $P_{mag}(\ell)$ is then smoothed over time to establish an average $\langle P_{mag} \rangle(\ell)$. Next, a ratio between these two quantities: $P_{mag}(\ell)/\langle P_{mag} \rangle(\ell)$ is established and then compared to a predefined threshold $P_{th}$ for detecting an instant increase in the pitch's magnitude. The threshold, $P_{th}$, is an optimized (tuned) parameter with values ranging from 1 to 10.

Although the presence of a dominant pitch is likely to indicate regions of voiced speech segments, it is insensitive to unvoiced utterances. Hence, a complementary detection mechanism is needed to address the issue of "unvoiced" speech segments.

Centrum Calculation for Unvoiced Speech Detection

Although the frequency distribution of unvoiced speech utterances lacks a natural harmonic structure, it is typically characterized by a higher expected frequency (i.e., higher center-of-mass frequency of the SNR distribution). The Centrum calculator can be described as follows:

$$\rho(k; \ell) = \frac{\widetilde{SNR}(\ell, k)}{\sum_{k=1}^{K} \widetilde{SNR}(\ell, k)} \quad (7)$$

$$\hat{k}_{Cent}(\ell) = \langle k \rangle_\rho = \sum_{k=1}^{K} k\rho(k; \ell) \quad (8)$$

$$I_{unvoiced}(\ell) = \begin{cases} 1, & \text{if } \hat{k}_{Cent}(\ell) \geq k_{th} \\ 0, & \text{otherwise} \end{cases} \quad (9)$$

$SNR(\ell,k)$ is the representation of $SNR_{dB}(\ell, k)$ in a linear scale and $\rho(l,k)$ is the distribution of $SNR(\ell,k)$. It is the distribution of the SNR over all frequencies (Note: summing $\rho(l,k)$ over k will equal 1.0). The SNR distribution is a function of the frame index, l, as for every time frame the distribution may change its properties. K and kth denote the number of frequency bins and a predefined threshold for the expected frequency, respectively. A typical value for the frequency representation of $k_{th}$ would be around 4 KHz.

Speech Features-Controlled Noise Statistics Calculation

The SFVAD system utilizes the two aforementioned speech features-based detectors to control the adaptation of the ambient noise's statistical properties. The noise component is calculated as follows:

$$I_{speech}(\ell) = I_{voiced}(\ell) \oplus I_{unvoiced}(\ell) \quad (10)$$

$$\tilde{\lambda}(\ell) = \begin{cases} \lambda, & \text{if } I_{speech}(\ell) \text{ is } 0 \\ 0, & \text{otherwise} \end{cases} \quad (11)$$

$$\langle\widetilde{v_{dB}}\rangle(\ell, k) = \tilde{\lambda}(\ell)\langle\widetilde{v_{dB}}\rangle(\ell - 1, k) + \left(1 - \tilde{\lambda}(\ell)\right)\mathcal{Y}_{dB}(\ell, k) \quad (12)$$

where $\oplus$ denotes the logical OR operator. $\lambda$ is a predefined smoothing factor (e.g., $\lambda$=0.8).

Sparsity-based Speech Detection

The SFVAD system uses a novel measure for speech detection, which is based on the sparsity nature of speech (i.e., the fact that speech segments often comprise only a few dominant frequency bins). While voiced and unvoiced speech detectors may capture a large portion of the possible phonemes, they might not be able to indicate "speech" on several types of consonants, for which the SNR Centrum is found in relatively low frequency bins, while the utterance lacks a natural harmonic structure. However, those phonemes can still be represented by a few dominant eigenvalues in the frequency domain. Therefore, a more generalized sparsity-based detector may be utilized to indicate the presence of speech segments. The following measures are used for sparsity-based speech detection:

$$S\left(\widetilde{SNR}_{dB}\right)(\ell) = \langle\widetilde{SNR}_{dB}\rangle_w(\ell) - \langle\widetilde{SNR}_{dB}\rangle(\ell) \quad (13)$$

$$\langle\widetilde{SNR}_{dB}\rangle_w(\ell) = \sum_{k=1}^{K} w(\ell, k)\widetilde{SNR}_{dB}(\ell, k) \quad (14)$$

$$\langle\widetilde{SNR}_{dB}\rangle(\ell) = \frac{1}{K}\sum_{k=1}^{K}\widetilde{SNR}_{dB}(\ell, k) \quad (15)$$

where $S(SNR_{dB})(\ell)$ denotes the sparsity measure of $SNR_{dB}$. In $\langle SNR_{dB}(\ell)$, the log-SNR is weighted in order to accentuate the large frequency eigenvalues in the presence of speech, and obtain a similar value as $\langle SNR_{dB}\rangle(\ell)$ in case the SNR is uniformly distributed. For this purpose, a logical choice for $w(\ell,k)$ would be $w(\ell,k)=\rho(l,k)$, as with respect to $SNR_{dB}$ the log-spectrogram is being exponentially accentuated.

It is important to note that, unlike conventional "energy-based" VAD methods, the current SFVAD sparsity metric, $S(SNR_{dB})$, is invariant to the power level of the input audio signal; but, instead, depends on its distribution over the frequency bins.

Figures 10, 11:
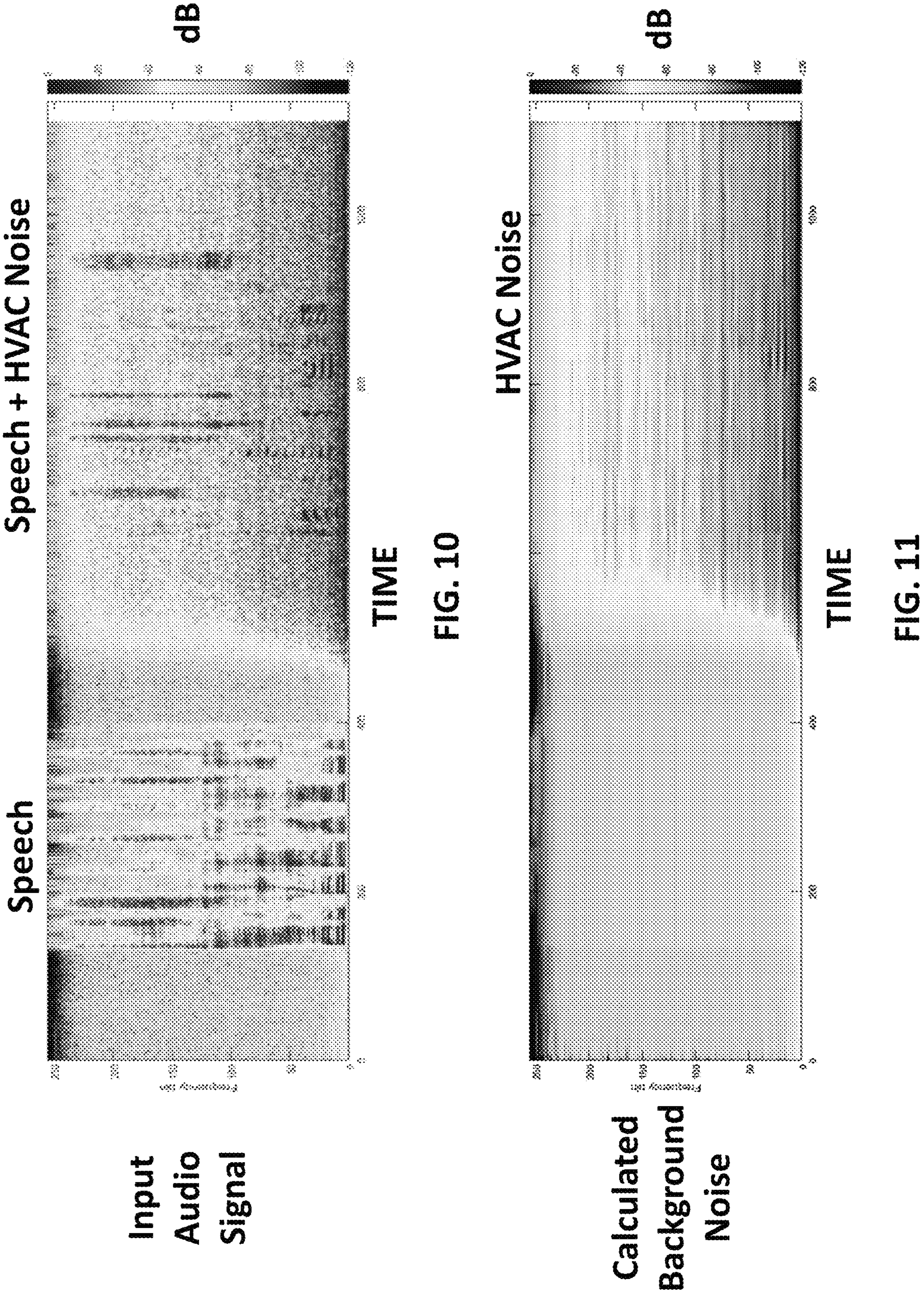
FIG. 10 shows an example of a spectrogram of an input audio signal that includes an instant transition from a relatively silent condition (30 dB SNR) to an extreme scenario of maximal HVAC noise (0 dB SNR), according to the present disclosure.
FIG. 11 shows an example of a spectrogram of the calculated background noise of the input audio signal shown in FIG. 10, which tracks the instant transition of the HVAC noise, according to the present disclosure.

FIG. 10 shows an example of a spectrogram of an input audio signal that includes an instant transition from a relatively silent condition (30 dB SNR) to an extreme scenario of maximal HVAC noise (0 dB SNR), according to the present disclosure.

FIG. 11 shows an example of a spectrogram of the Calculated Background Noise of the input audio signal shown in FIG. 10, which tracks the instant transition of the HVAC noise, according to the present disclosure.

Figures 12, 13:
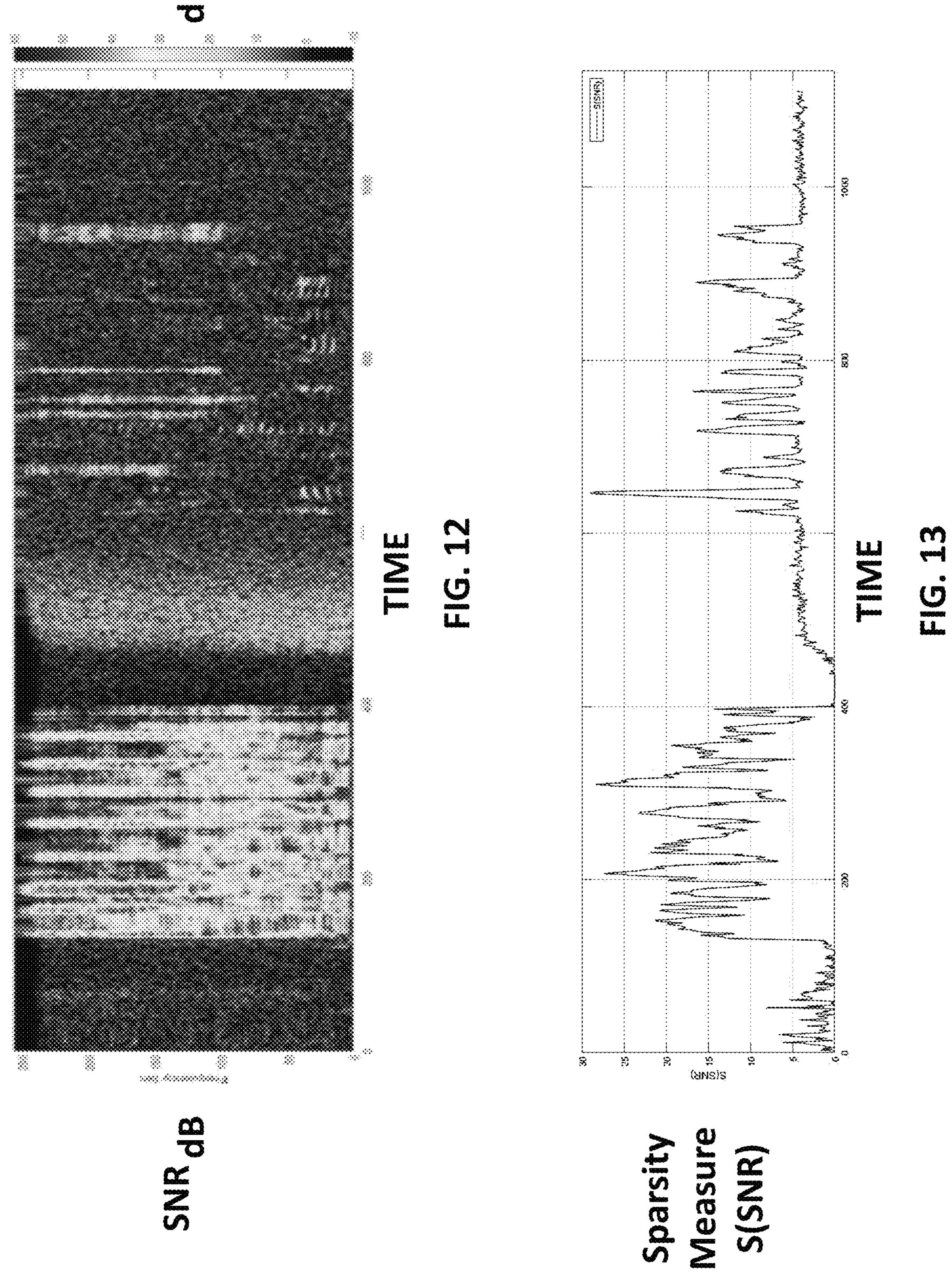
FIG. 12 presents an example showing a difference between the input audio signal spectrogram from FIG. 10 and the calculated background noise signal spectrogram from FIG. 11 (i.e., $SNR_{dB}(\ell, k)$).
FIG. 13 shows an example of a plot of a sparsity measure, S(SNR), versus time, based on the calculated $SNR_{dB}$ signal shown in FIG. 12.

FIG. 12 presents an example showing a difference (i.e., $SNR_{dB}(\ell, k)$) between the input audio signal spectrogram from FIG. 10 and the calculated background noise signal spectrogram from FIG. 11, according to the present disclosure. This figure shows that the calculated noise level converges in about 1.3 seconds, while still being able to exclude speech bins. It can be observed that the instant change of the noise level leads to relatively high SNR calculation of the followed noise bins, and it may potentially mislead a conventional "energy-based" VAD system. The distribution of these frequency bins does not coincide with a natural harmonic structure, nor with a high expected frequency (i.e., SNR Centrum). Thus, the current SFVAD system enables adaptation of the noise calculation (which includes an iterative method), allowing a convergence to a new state. This convergence means that the SFVAD's noise calculation method was able to converge to the new power level of the noise, without classifying the transition frames as "speech".

FIG. 13 shows an example of a plot of the sparsity measure, S(SNR), versus time, based on the calculated $SNR_{dB}$ signal shown in FIG. 12.

Figure 14:
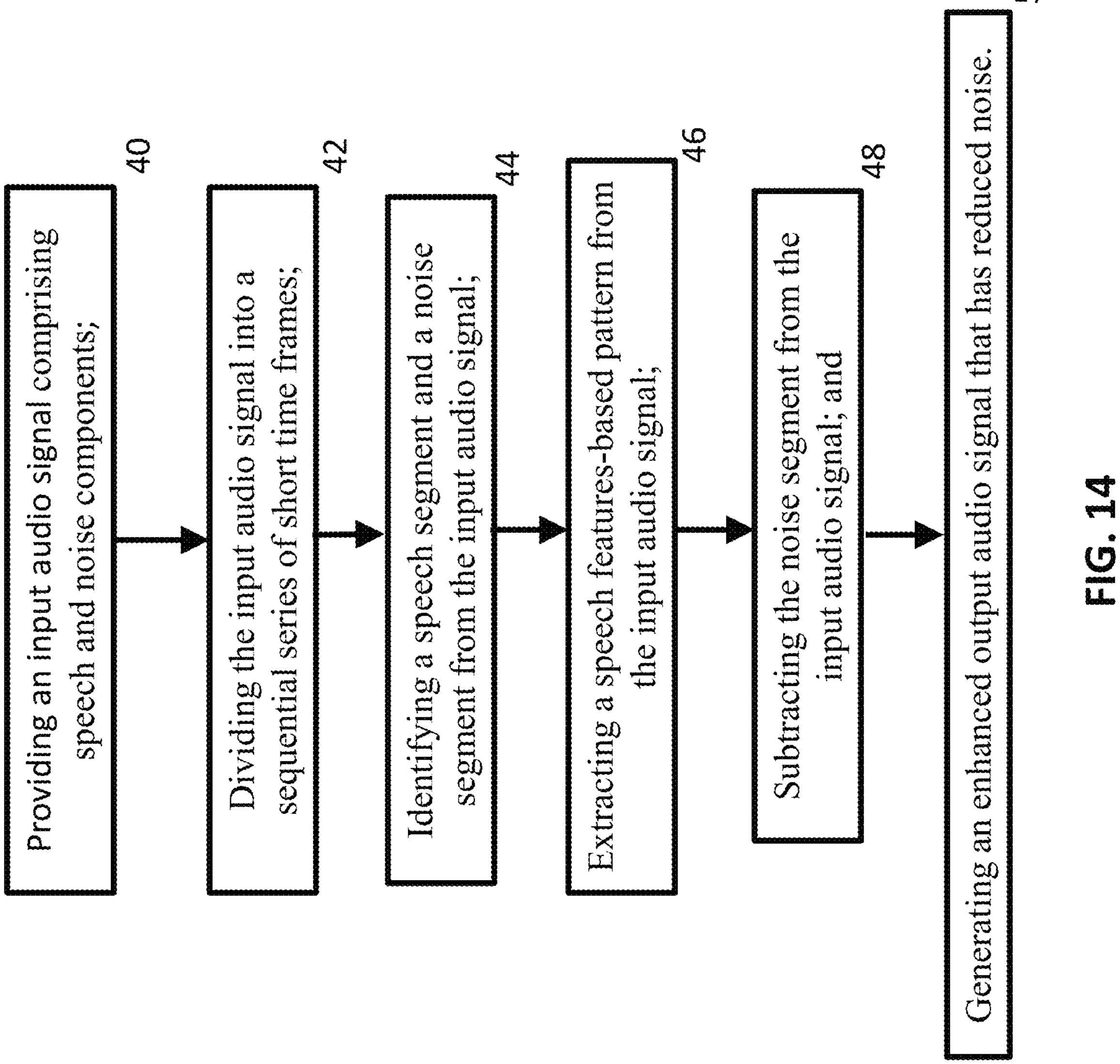
FIG. 14 shows an example of a flow chart describing a method for performing Speech Features-based Voice Activity Detection, according to the present disclosure.

FIG. 14 shows an example of a flow chart describing a method for performing Speech Features-based Voice Activity Detection of an input audio signal that comprises both speech and noise components, according to the present disclosure. The flow chart illustrates performing the following steps:

a) providing an input audio signal comprising speech and noise components, 40;

b) dividing the input audio signal into a sequential series of time frames, 42;

c) identifying a speech segment and a noise segment from the input audio signal, 44;

d) extracting speech features-based patterns from the input audio signal, 46;

c) subtracting the noise segment from the input audio signal, 48; and f) generating an enhanced output audio signal that has reduced noise, 50.

Figure 15:
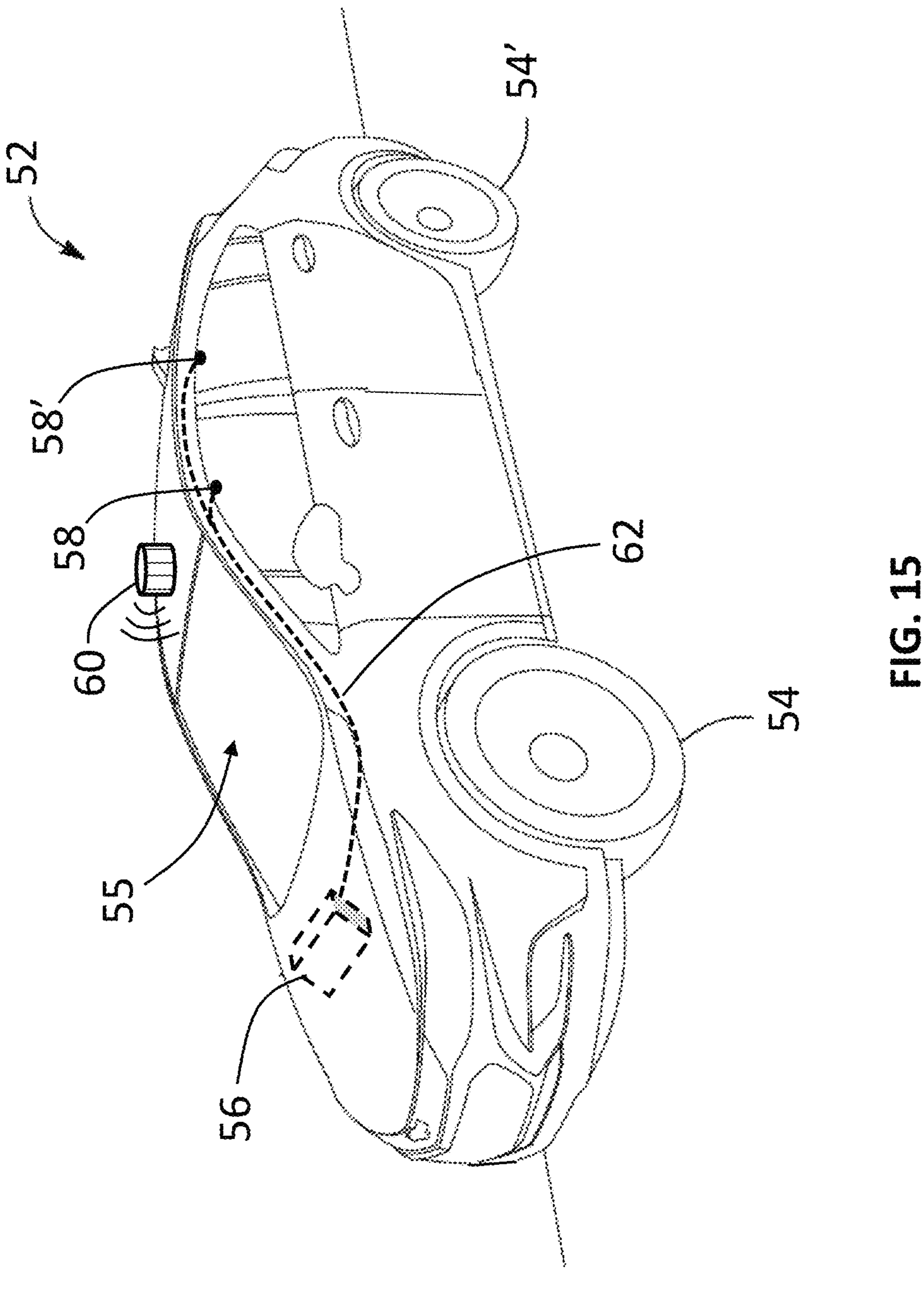
FIG. 15 shows a 3-D perspective view of an example of a motor vehicle with a plurality of microphones disposed inside the motor vehicle's interior cabin, and a computer processor unit disposed inside the motor vehicle for performing the SFVAD digital noise reduction method, according to the present disclosure.

FIG. 15 shows a 3-D perspective view of an example of a motor vehicle 52 with a plurality of road wheels 54, 54', etc. connected to motor vehicle 52; a plurality of microphones 58, 58', etc. disposed inside the motor vehicle's interior cabin 55, and a computer processor unit (CPU) 56 connected to the motor vehicle 52 for performing the SFVAD digital noise reduction method, according to the present disclosure. The first microphone 58 is located close to the driver (not shown), while the second microphone 58' is located elsewhere inside the interior cabin 55, for example, in a back row. CPU 56 includes a computer processor, associated memory, and electrical connection 62 from the plurality of microphones, 58, 58', etc. to CPU 56. LIDAR sensor 60 is mounted on the roof of motor vehicle 52. Alternatively, microphones 58, 58', etc. can be wirelessly connected to CPU 56.

Certain aspects of this disclosure may be implemented, in some embodiments of a computerized SFVAD system, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow block diagrams depicted herein, many other methods for implementing the example machine-readable instructions may alternatively be used.

What is claimed is:

1. A computerized method of digital signal processing, comprising:

a) providing an input audio signal comprising speech and noise components;

b) dividing the input audio signal into a sequential series of time frames;

c) identifying a speech segment and/or a noise segment from the input audio signal;

d) extracting a speech features-based pattern from the input audio signal;

e) subtracting the noise segment from the input audio signal;

f) generating an enhanced output audio signal that has reduced noise; and r) providing and operating a Single-Channel Voice Activity Detector (SCVAD) module;

wherein the Single-Channel Voice Activity Detector (SC-VAD) module comprises:

a Log-Spectral Noise Suppression module;

a Sparsity Detection module;

an Energy-based Speech and Noise Bin-Maps Calculation module;

a Pitch Calculation module;

a Centrum Calculation module;

a Noise Statistics Calculation module;

a Decision Block module; and a $Z^{-1}$ module;

wherein the input audio signal is inputted to the Log-Spectral Noise Suppression module and is also inputted in parallel to the Noise Statistics Calculation module;

wherein a first output from the Log-Spectral Noise Suppression module comprises a Signal-to-Noise Ratio measure, $\widehat{SNR}$(l,k), that is inputted, in parallel, into four modules that comprise:

the Sparsity Detection Module;

the Energy-based Speech and Noise Bin-Maps Calculation Module;

the Pitch Calculation Module; and the Centrum Calculation Module;

wherein a second output from the Sparsity Detection module is inputted into the Decision Block module;

wherein a third output from the Energy-based Speech and Noise Bin-Maps Calculation module is inputted into the Decision Block module;

wherein a fourth output from the Pitch Calculation module is inputted in parallel into both the Decision Block module and the Noise Statistics Calculation module;

wherein a fifth output from the Centrum Calculation module is inputted, in parallel, into both the Decision Block module and the Noise Statistics Calculation module;

wherein a sixth output, $\langle\hat{v}\rangle$(l,k), from the Noise Statistics Calculation module is input to the $Z^{-1}$ module;

wherein a seventh output from the $Z^{-1}$ module is fed back into the Log-Spectral Noise Suppression module;

wherein the Decision Block module outputs four parameters: $I_S$(l), $I_N$(l), $M_S$(l,k), and $M_N$(l,k);

wherein $I_S$(l)=a binary speech indicator that=1 if only speech is present and =0 if not only speech is present;

wherein $I_N$(l)=a binary noise indicator that=1 if only noise is present and =0 if not only noise is present;

wherein $M_S$(l,k)=a Speech Time-Frequency Mask;

wherein $M_N$(l,k)=a Noise Time-Frequency Mask;

wherein "l" represents a selected time frame from the input audio signal, and wherein "k'" represents a selected frequency bin from the input audio signal; and further g) using the Sparsity Detection module to identify speech utterances by using a sparsity measure that is denoted by S(SNR);

wherein S(SNR) equals a difference between a weighted average of the Signal-to-Noise Ratio (SNR) and an arithmetic average of the SNR in a log-spectrum domain, according to the following equations:

$$S(\widehat{SNR}_{dB})(\ell) = \langle\widehat{SNR}_{dB}\rangle_w(\ell) - \langle\widehat{SNR}_{dB}\rangle(\ell); \quad \text{(eq. 1)}$$

$$\langle\widehat{SNR}_{dB}\rangle_w(\ell) = \sum_{k=1}^{K} w(\ell, k)\widehat{SNR}_{dB}(\ell, k); \text{ and} \quad \text{(eq. 2)}$$

$$\langle\widehat{SNR}_{dB}\rangle(\ell) = \frac{1}{K}\sum_{k=1}^{K}\widehat{SNR}_{dB}(\ell, k); \quad \text{(eq. 3)}$$

wherein $S(SNR_{dB})(\ell)$ denotes a SFVAD sparsity measure of $SNR_{dB}$;

wherein $\widehat{SNR}_{dB}(\ell,k)$ is weighted by weights $w(\ell,k)$, according to (eq. 2), which accentuate large frequency eigenvalues in the presence of speech; and wherein the SFVAD sparsity measure, $S(SNR_{dB})(\ell)$, is invariant to a power level of the input audio signal, $x_{ref}(\ell,k)$; and wherein $SNR_{dB}(\ell,k)$ is a suppressed log-spectrum of the input audio signal, $x_{ref}(\ell,k)$.

2. The computerized method of claim 1, further comprising:

g) controlling an adaptation of a Beam-Forming system control system by utilizing a speech time-frequency mask and a noise time-frequency mask.

3. The computerized method of claim 1, further comprising:

h) performing single-channel voice activity detection that utilizes dominant speech features and that adapts to spectral changes of the noise segment.

4. The computerized method of claim 1, further comprising:

i) analyzing a previous speech segment; and then j) resetting a Beam-Forming system control module using information learned from analyzing the previous speech segment.

5. The computerized method of claim 1, further comprising:

k) calculating noise statistics from a noise spectrum using a log-spectral domain.

6. The computerized method of claim 1, wherein identifying the noise segment comprises:

(1) using a voiced speech detector that detects voiced speech; and (2) using an unvoiced speech detector that detects unvoiced speech; and l) preventing contamination of the noise segment by the speech segment.

7. The computerized method of claim 6, further comprising:

m) detecting a voiced speech segment by using a Cepstral-based pitch detector to identify a dominant pitch from a frame of the input audio signal; and n) preventing contamination of the noise segment by the voiced speech segment.

8. The computerized method of claim 6, further comprising:

o) detecting an unvoiced speech segment by using a Centrum calculation of higher expected frequencies from a frame of the input audio signal; and p) preventing contamination of the noise segment by the unvoiced speech segment.

9. The computerized method of claim 1, wherein noise adaptation occurs in a Beam-Forming system.

10. The computerized method of claim 1, further comprising:

r) using a speech time-frequency mask to improve calculation of one or more microphone Relative Transfer Functions (RTFs).

11. The computerized method of claim 1, further comprising:

s) providing a Speech Features-based Voice Activity Detection (SFVAD) system;

t) utilizing dominant speech features;

u) adapting, over time, the SFVAD system to spectral changes of the noise components; and v) calculating per-frame speech and noise indications by using speech and noise time-frequency masks, respectively.

12. A computer-readable medium comprising computer instructions comprising:

a) providing an input audio signal comprising speech and noise components;

b) dividing the input audio signal into a sequential series of time frames;

c) identifying a speech segment and a noise segment from the input audio signal;

d) extracting a speech features-based pattern from the input audio signal;

e) subtracting the noise segment from the input audio signal;

f) generating an enhanced output audio signal that has reduced noise; and r) providing and operating a Single-Channel Voice Activity Detector (SCVAD) module;

wherein the Single-Channel Voice Activity Detector (SCVAD) module comprises:

a Log-Spectral Noise Suppression module;

a Sparsity Detection module;

an Energy-based Speech and Noise Bin-Maps Calculation module;

a Pitch Calculation module;

a Centrum Calculation module;

a Noise Statistics Calculation module;

a Decision Block module; and a $Z^{-1}$ module;

wherein the input audio signal is inputted to the Log-Spectral Noise Suppression module and is also inputted in parallel to the Noise Statistics Calculation module;

wherein a first output from the Log-Spectral Noise Suppression module comprises a Signal-to-Noise Ratio measure, $\widehat{SNR}(l,k)$, that is inputted, in parallel, into four modules that comprise:

the Sparsity Detection Module;

the Energy-based Speech and Noise Bin-Maps Calculation Module;

the Pitch Calculation Module; and the Centrum Calculation Module;

wherein a second output from the Sparsity Detection module is inputted into the Decision Block module;

wherein a third output from the Energy-based Speech and Noise Bin-Maps Calculation module is inputted into the Decision Block module;

wherein a fourth output from the Pitch Calculation module is inputted in parallel into both the Decision Block module and the Noise Statistics Calculation module;

wherein a fifth output from the Centrum Calculation module is inputted, in parallel, into both the Decision Block module and the Noise Statistics Calculation module;

wherein a sixth output, $\langle\hat{v}\rangle(l,k)$, from the Noise Statistics Calculation module is input to the $Z^{-1}$ module;

wherein a seventh output from the $Z^{-1}$ module is fed back into the Log-Spectral Noise Suppression module;

wherein the Decision Block module outputs four parameters: $I_S(l)$, $I_N(l)$, $M_S(l,k)$, and $M_N(l,k)$;

wherein $I_S(1)$=a binary speech indicator that=1 if only speech is present and =0 if not only speech is present;

wherein $I_N(1)$=a binary noise indicator that=1 if only noise is present and =0 if not only noise is present;

wherein $M_S(l,k)$=a Speech Time-Frequency Mask;

wherein $M_N(l,k)$=a Noise Time-Frequency Mask;

wherein "l" represents a selected time frame from the input audio signal, and wherein "k" represents a selected frequency bin from the input audio signal; and further q) using the Sparsity Detection module to identify speech utterances by using a sparsity measure that is denoted by S(SNR);

wherein S(SNR) equals a difference between a weighted average of the Signal-to-Noise Ratio (SNR) and an arithmetic average of the SNR in a log-spectrum domain, according to the following equations:

$$S(\widehat{SNR}_{dB})(\ell) = \langle\widehat{SNR}_{dB}\rangle_w(\ell) - \langle\widehat{SNR}_{dB}\rangle(\ell); \quad \text{(eq. 1)}$$

$$\langle\widehat{SNR}_{dB}\rangle_w(\ell) = \sum_{k=1}^{K} w(\ell, k)\widehat{SNR}_{dB}(\ell, k); \quad \text{(eq. 2)}$$

$$\langle\widehat{SNR}_{dB}\rangle(\ell) = \frac{1}{K}\sum_{k=1}^{K} \widehat{SNR}_{dB}(\ell, k); \quad \text{(eq. 3)}$$

and wherein $S(SNR_{dB})(\ell)$ denotes a SFVAD sparsity measure of $SNR_{dB}$;

wherein $\widehat{SNR}_{dB}(\ell,k)$ is weighted by weights $w(\ell,k)$, according to (eq. 2), which accentuate large frequency eigenvalues in the presence of speech; and wherein the SFVAD sparsity measure, $S(SNR_{dB})(\ell)$, is invariant to a power level of the input audio signal, $x_{ref}(\ell,k)$; and wherein $SNR_{dB}(\ell,k)$ is a suppressed log-spectrum of the input audio signal, $x_{ref}(\ell,k)$.

13. The computer-readable medium of claim 12, wherein the computer instructions further comprise:

g) providing a Speech Features-Based Voice Activity Detection (SFVAD) system;

h) utilizing dominant speech features;

i) adapting the SFVAD system to spectral changes of the noise components over time; and j) calculating speech and noise time-frequency masks at a specified time-frame.

14. The computer-readable medium of claim 12, wherein the computer instructions further comprise:

k) using a voiced speech detector that detects a voiced speech segment;

l) Using an unvoiced speech detector that detects an unvoiced speech segment;

m) preventing contamination of the identified noise segment by the speech segment.

15. The computer-readable medium of claim 12, wherein the computer instructions further comprise:

m) detecting a voiced speech segment by using a Cepstral-based pitch detector to identify a dominant pitch from a speech segment of the input audio signal;

n) preventing contamination of the noise segment by the voiced speech segment;

o) detecting an unvoiced speech segment by using a Centrum calculation of higher expected frequencies from a segment of the input audio signal; and p) preventing contamination of the noise segment by the unvoiced speech segment.

* * * * *